US008521626B1

(12) United States Patent
Orttung et al.

(10) Patent No.: US 8,521,626 B1
(45) Date of Patent: Aug. 27, 2013

(54) SYSTEM AND METHOD FOR ENHANCED GENERATION OF INVOICE PAYMENT DOCUMENTS

(75) Inventors: Mark Orttung, Menlo Park, CA (US); Rene Lacerte, Portola Valley, CA (US)

(73) Assignee: Bill.com, Inc., Palo Alto, CA (US)

( * ) Notice: Subject to any disclaimer, the term of this patent is extended or adjusted under 35 U.S.C. 154(b) by 342 days.

(21) Appl. No.: 12/483,723

(22) Filed: Jun. 12, 2009

Related U.S. Application Data

(63) Continuation of application No. 12/363,647, filed on Jan. 30, 2009.

(60) Provisional application No. 61/025,255, filed on Jan. 31, 2008, provisional application No. 61/059,624, filed on Jun. 6, 2008, provisional application No. 61/088,984, filed on Aug. 14, 2008, provisional application No. 61/140,752, filed on Dec. 24, 2008, provisional application No. 61/141,819, filed on Dec. 31, 2008.

(51) Int. Cl.
*G07F 19/00* (2006.01)
*G07F 7/10* (2006.01)
*H04M 15/00* (2006.01)
*G06Q 40/00* (2012.01)

(52) U.S. Cl.
USPC .................................. 705/34; 705/33; 705/40

(58) Field of Classification Search
USPC ........................................................... 705/34
See application file for complete search history.

(56) References Cited

U.S. PATENT DOCUMENTS

| | | | | |
|---|---|---|---|---|
| 5,558,232 A * | 9/1996 | Stevens et al. | ................ | 209/584 |
| 5,649,115 A * | 7/1997 | Schrader et al. | ................ | 705/33 |
| 5,810,173 A * | 9/1998 | Stevens et al. | ................ | 209/539 |
| 5,926,392 A * | 7/1999 | York et al. | ..................... | 700/223 |
| 6,044,362 A * | 3/2000 | Neely | ............................. | 705/34 |
| 6,058,380 A * | 5/2000 | Anderson et al. | ............... | 705/40 |
| 6,108,513 A * | 8/2000 | Landa et al. | .................. | 399/384 |
| 6,285,991 B1 * | 9/2001 | Powar | ............................. | 705/76 |
| 6,292,789 B1 | 9/2001 | Schutzer | | |
| 6,343,275 B1 * | 1/2002 | Wong | .......................... | 705/26.1 |
| 6,360,951 B1 | 3/2002 | Swinehart | | |
| 6,385,595 B1 * | 5/2002 | Kolling et al. | ................. | 705/40 |
| 6,408,284 B1 * | 6/2002 | Hilt et al. | ........................ | 705/40 |
| 6,650,767 B2 | 11/2003 | Jones et al. | | |
| 7,004,393 B2 * | 2/2006 | Schum et al. | ............ | 235/462.08 |

(Continued)

OTHER PUBLICATIONS

Quickbooks course, Sun Journal, Sep. 24, 2007:B3.*

(Continued)

*Primary Examiner* — Matthew S Gart
*Assistant Examiner* — Harshad Parikh
(74) *Attorney, Agent, or Firm* — Greenberg Traurig, LLP

(57) ABSTRACT

Enhanced systems and methods for processing invoices, checks, and money transfers are described. Various aspects include the following: Invoices are compared to distinguishing features of known templates. Templates of matching features are used to extract data in the invoices. Enhanced payment documents are generated to include images of related invoices to ensure proper deposit. Payee information solicited from a payee is printed on an endorsement section of a check payable to the payee to ensure proper deposit. The payee information can be verified through a mock transaction. Unique invoice numbers and payor numbers are included in invoices to ensure proper accreditation of payments of the invoices. Money transfers among accounts of different banks are effected through master accounts in the different banks.

17 Claims, 13 Drawing Sheets

(56) References Cited

U.S. PATENT DOCUMENTS

| | | | |
|---|---|---|---|
| 7,177,828 B1 | 2/2007 | Land et al. | |
| 7,317,823 B1 | 1/2008 | Price et al. | |
| 7,512,564 B1 * | 3/2009 | Geer | 705/45 |
| 7,515,697 B2 * | 4/2009 | Eng et al. | 379/115.01 |
| 7,536,325 B2 | 5/2009 | Randell et al. | |
| 7,637,423 B2 * | 12/2009 | Meidell et al. | 235/379 |
| 7,668,363 B2 * | 2/2010 | Price et al. | 382/137 |
| 7,767,925 B2 * | 8/2010 | DiBiaso et al. | 209/584 |
| 8,045,784 B2 * | 10/2011 | Price et al. | 382/137 |
| 8,195,570 B1 * | 6/2012 | Barron et al. | 705/45 |
| 8,315,900 B2 * | 11/2012 | Schwarz et al. | 705/7.12 |
| 2002/0019808 A1 | 2/2002 | Sharma | |
| 2002/0128967 A1 | 9/2002 | Meyer et al. | |
| 2002/0133441 A1 | 9/2002 | Tanaka | |
| 2002/0143674 A1 * | 10/2002 | Beckman | 705/34 |
| 2002/0143716 A1 * | 10/2002 | Byrne et al. | 705/412 |
| 2002/0194127 A1 * | 12/2002 | Randell et al. | 705/40 |
| 2003/0009420 A1 * | 1/2003 | Jones | 705/39 |
| 2003/0033159 A1 * | 2/2003 | Altomare | 705/1 |
| 2003/0036999 A1 * | 2/2003 | Mirlas et al. | 705/40 |
| 2003/0069933 A1 * | 4/2003 | Lim et al. | 709/206 |
| 2003/0093414 A1 | 5/2003 | Litzow et al. | |
| 2003/0191701 A1 * | 10/2003 | Haseltine et al. | 705/34 |
| 2003/0220855 A1 * | 11/2003 | Lam et al. | 705/34 |
| 2003/0220875 A1 * | 11/2003 | Lam et al. | 705/45 |
| 2003/0233321 A1 | 12/2003 | Scolini et al. | |
| 2004/0015445 A1 * | 1/2004 | Heaven et al. | 705/51 |
| 2004/0034594 A1 | 2/2004 | Thomas et al. | |
| 2004/0064375 A1 * | 4/2004 | Randell et al. | 705/26 |
| 2004/0098338 A1 * | 5/2004 | Uehara et al. | 705/42 |
| 2004/0108382 A1 * | 6/2004 | Schum et al. | 235/462.08 |
| 2004/0143547 A1 * | 7/2004 | Mersky | 705/40 |
| 2004/0167823 A1 * | 8/2004 | Neely et al. | 705/26 |
| 2004/0167853 A1 | 8/2004 | Sharma | |
| 2004/0181493 A1 * | 9/2004 | Cross et al. | 705/75 |
| 2004/0199427 A1 | 10/2004 | van der Loo | |
| 2004/0216010 A1 | 10/2004 | Muller | |
| 2005/0091132 A1 * | 4/2005 | Phillips et al. | 705/33 |
| 2005/0102608 A1 | 5/2005 | Batres | |
| 2005/0151999 A1 * | 7/2005 | Inikori | 358/1.18 |
| 2006/0116956 A1 * | 6/2006 | Leavitt et al. | 705/40 |
| 2006/0282381 A1 * | 12/2006 | Ritchie | 705/42 |
| 2007/0045930 A1 * | 3/2007 | Hayduchok et al. | 271/2 |
| 2007/0067240 A1 | 3/2007 | George | |
| 2007/0112674 A1 | 5/2007 | Jones | |
| 2007/0260536 A1 | 11/2007 | Stone | |
| 2007/0271160 A1 | 11/2007 | Stone et al. | |
| 2007/0288364 A1 | 12/2007 | Gendler | |
| 2008/0010199 A1 * | 1/2008 | Allin et al. | 705/40 |
| 2008/0015982 A1 * | 1/2008 | Sokolic et al. | 705/39 |
| 2008/0033851 A1 | 2/2008 | Williams et al. | |
| 2008/0040264 A1 * | 2/2008 | Allin et al. | 705/39 |
| 2008/0046363 A1 | 2/2008 | Ali et al. | |
| 2008/0123932 A1 | 5/2008 | Jones et al. | |
| 2008/0162311 A1 | 7/2008 | Hendrix et al. | |
| 2008/0208727 A1 | 8/2008 | McLaughlin et al. | |
| 2008/0249936 A1 | 10/2008 | Miller et al. | |
| 2008/0249951 A1 | 10/2008 | Gilder et al. | |
| 2008/0288413 A1 * | 11/2008 | Weber | 705/71 |
| 2008/0319882 A1 * | 12/2008 | Wyle | 705/31 |
| 2009/0060314 A1 | 3/2009 | Price et al. | |
| 2009/0063206 A1 | 3/2009 | Payne et al. | |
| 2009/0132286 A1 | 5/2009 | Blaquier | |
| 2009/0132414 A1 | 5/2009 | Philliou et al. | |
| 2009/0164325 A1 * | 6/2009 | Bishop et al. | 705/17 |
| 2009/0182605 A1 | 7/2009 | Lappas et al. | |
| 2009/0204519 A1 * | 8/2009 | Randell et al. | 705/30 |
| 2009/0204522 A1 * | 8/2009 | Meyer et al. | 705/34 |
| 2009/0292619 A1 | 11/2009 | Kagan et al. | |
| 2010/0114766 A1 | 5/2010 | Gustin et al. | |
| 2010/0128324 A1 | 5/2010 | Price et al. | |
| 2010/0145839 A1 * | 6/2010 | Lam et al. | 705/34 |
| 2010/0161466 A1 | 6/2010 | Gilder | |
| 2011/0270749 A1 * | 11/2011 | Bennett et al. | 705/40 |

OTHER PUBLICATIONS

Office Action for U.S. Appl. No. 12/483,731, Feb. 17, 2010, 42 Pages.
Office Action for U.S. Appl. No. 12/483,740, Feb. 5, 2010, 26 Pages.
Avery, S., "Computers, Business Systems and Office Products," Purchasing, Boston, Jul. 11, 1996, pp. 125-135, vol. 120, Issue 11.
Bers, J.S., "Image-Based Bill Payment Profits Bank of Montreal," Bank Systems and Technology, New York, Oct. 1999, p. 33, vol. 33, Issue 10.
De Felice, A., "Rene Lacerte: Entrepreneur by Blood," Accounting Technology, Boston, Jan./Feb. 2008, p. 40, vol. 24, Issue 1.
Lynne, D.A., "Managing Your Agency Office," Canadian Insurance, Toronto, Sep. 1980, p. 22, vol. 85, Issue 10.
Tulenko, P., "Keeping Honest Workers Honest," Cincinnati Post, Cincinnati, Ohio, Mar. 20, 2006, p. c.8.0.
United States Office Action, U.S. Appl. No. 12/483,731, Jul. 20, 2010, 43 pages.

* cited by examiner

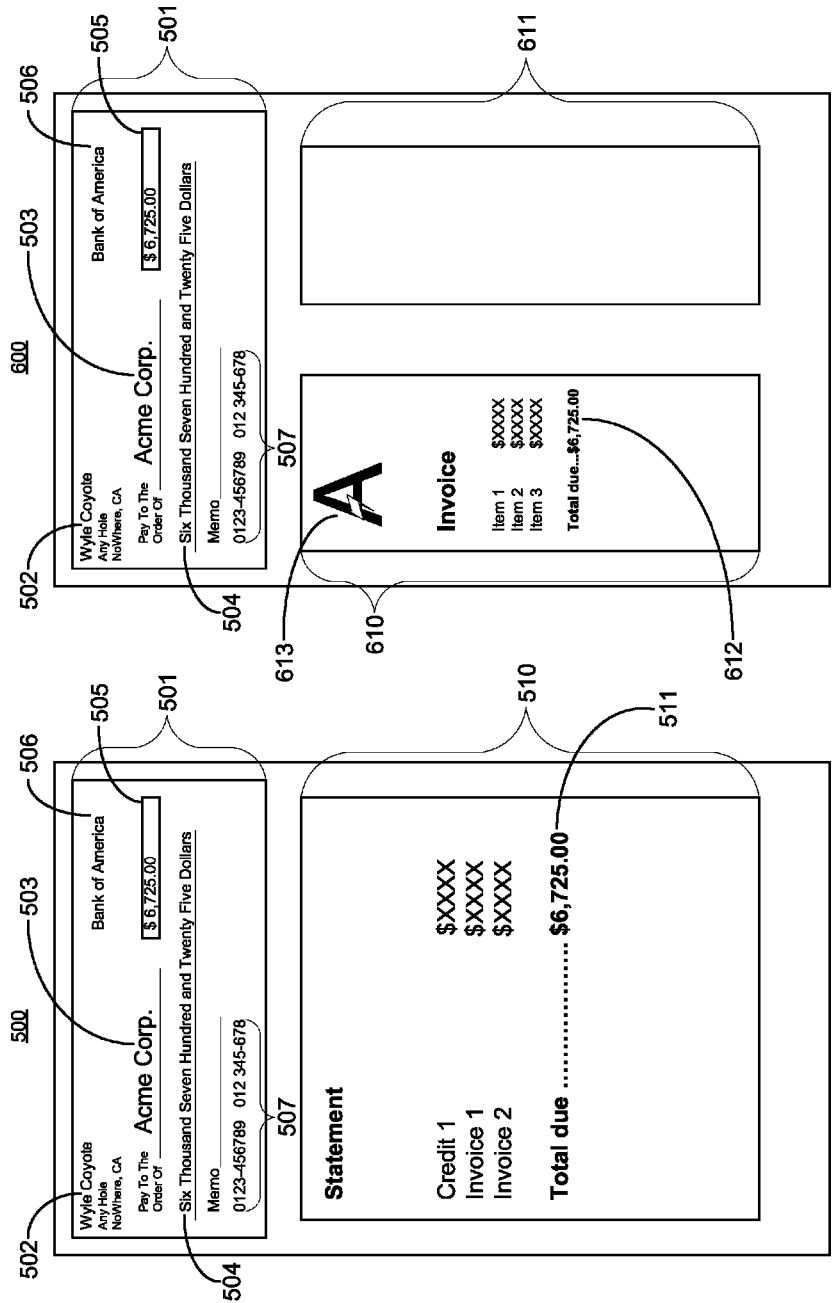

SYSTEM AND METHOD FOR ENHANCED GENERATION OF INVOICE PAYMENT DOCUMENTS

CROSS-REFERENCE TO RELATED APPLICATION

This application is a divisional of U.S. patent application Ser. No. 12/363,647, filed on Jan. 30, 2009. U.S. patent application Ser. No. 12/363,647 claims priority under 35 U.S.C. §119(e) to U.S. Provisional Patent Application Ser. No. 61/025,255, "System and Method for Enhanced Capture of Invoices into an Electronic Payment System," filed Jan. 31, 2008; U.S. Provisional Patent Application Ser. No. 61/059,624, "System and Method for Enhanced Generation of Invoice Payment Documents," filed Jun. 6, 2008; U.S. Provisional Patent Application Ser. No. 61/088,984, "Enhanced System and Method to Verify That Checks Are Deposited in the Correct Account," filed Aug. 14, 2008; U.S. Provisional Patent Application Ser. No. 61/140,752, "Enhanced System and Method to Verify That Checks Are Deposited in the Correct Account," filed Dec. 24, 2008; and U.S. Provisional Patent Application Ser. No. 61/141,819, "Enhanced System And Method For Private Interbank Clearing System," filed Dec. 31, 2008. The subject matter of all of the foregoing is incorporated herein by reference in their entirety.

BACKGROUND OF THE INVENTION

1. Field of the Invention

This invention relates generally to automated computer processing of invoices, checks, and money transfers.

2. Description of the Related Art

For years companies have been trying to move transactions into an electronic system. Large businesses have the resources and scale to justify the installation of new electronic systems. However, for a large segment of small and medium size enterprises (SMEs), such attempts have not fared well. This is because it is not cost effective for SMEs to install a dedicated system and there is no standardized transaction system to allow the sharing of costs among many different businesses. For example, each bank offers its own web site payment option, and companies such as Quicken offer either online or check printing or manual check writing as payment methods. However, invoice entry is entirely manual. As a result, it is still the general practice for businesses to send paper invoices to customers, which the customers then process manually.

Very often companies pay by check. Sometimes a check refers to an invoice. However, often the reference is unclear to the receiver. For example, the company issuing the check may use an internal reference number rather than the invoice number, or there may be some other problems that make it difficult for the receiver to match the check to its parent invoice.

When a payor sends a check for payment or for deposit to an account, the check may end up being deposited in an incorrect account, either by mistake or by intent. The risk is even greater for payments and deposits made via electronic payment services because there is no signature involved in electronic payments, making people more inclined to commit fraud. In addition, because there are fewer controls in place for electronic payments, the possibility for errors is greater.

Companies generally prefer to receive checks in a check lockbox (also referred to simply as a lockbox), which typically refers to a service that receives checks for its clients via mail, opens the mail, processes the checks, deposits the money into the clients' accounts, and creates documentation for the clients' accounting departments. Even though many attempts have been made to reduce the amount of labor required, the above process remains labor-intensive and therefore costly. One example situation that requires manual intervention is simultaneous duplication of identification numbers. Such a situation occurs when multiple clients start to use the same accounting software at the same time. As a result, multiple clients are likely to generate invoices with the same invoice numbers and payor numbers. Manual intervention is generally necessary in such a situation to avoid bookkeeping errors and misassigned checks.

There are commonly five options available to effect payments between accounts at different banks: (1) check payments, (2) electronic checks, (3) EFT (Electronic Funds Transfer) or ACH (Automated Clearing House) payments, (4) wire transfer, and (5) third-party bill payment services. Check clearing, although nominally one to three business days, often can take longer with out-of-state banks EFT and ACH typically take between one and three business days and are not widely adopted because of the complexity of managing information of the banks and accounts. Wire transfers typically are expensive and complex to initiate. Third-party bill payment services typically pull money electronically from the payor and send money to the payee via one of the first four options. Sometimes it takes a third-party bill payment service up to seven days to transfer money such that the service provider can guard against credit risk at the payor.

SUMMARY OF THE INVENTION

The present invention overcomes the limitations of the prior art by providing enhanced systems and methods for processing invoices, checks, and money transfers.

In one aspect of the invention, many invoices are received. The received invoices are compared to a database of distinguishing features. These distinguishing features are for known templates of invoices from different issuers. Templates are selected for the invoices based on the comparisons to the distinguishing features. This also identifies the issuers for the invoices. Data is extracted from the invoices based on the selected templates. In this way, invoice capture (and settlement) can be automated.

In another aspect of the invention, a community of recipients helps to refine the overall process. For example, the community of recipients may provide input concerning the distinguishing features for templates, and this input may be used to define or refine the distinguishing features. The community may also provide input concerning the templates themselves (e.g., the locations of various fields of data), and this input may be used to define or refine the templates. A more organized community process may even be used to regulate the input provided by the community.

Various techniques can be used to distinguish invoices from each other, and to extract data from recognized invoices. Various techniques may also be used to develop and refine the distinguishing features as well as the templates.

In yet another aspect of the invention, multiple invoices are selected for payment. A user is prompted to determine whether to issue a check for multiple invoices. If the user issues a separate check for each invoice, a payment document print file is generated for each check and corresponding invoice. The payment document contains an image of the corresponding invoice. The payment documents are stored and sent to the printer for printing. If the user issues a check for multiple invoices, a payment document is generated to contain images of the multiple invoices, and displayed for user approval. If the user approves, the payment document is stored and printed. Otherwise, the user is prompted again to determine whether to issue the check for multiple invoices and the process repeats.

In another aspect of the invention, before a check is printed out, a message is sent to a payee of the check for deposit information. The deposit information is printed on the check's endorsement section to ensure that the check will be deposited in a correct account.

In yet another aspect of the invention, the deposit information received form a payee is verified using one of the following approaches. A check can be issued with the information printed in the endorsement section. If the check is successfully deposited, the information can be considered verified by the depositing bank and therefore verified. In addition, the information of previously cleared checks can be used to compare with and verify the deposit information. The random deposit approach can also be utilized to verify the deposit information.

Also, information for cleared checks can be utilized to reconcile with payee identification data on the record to detect fraud.

In another aspect of the invention, a unique payor number and a unique invoice number are generated and printed on an invoice. A check made for payment of the invoice is scanned in a lockbox system. The payor number or invoice number is located in the scanned check. The lockbox system identifies a lockbox customer for whom the check is made payable, and deposits the check in the customer's account. In addition, the lockbox system also identifies a payor of the check and credits the payor's account with the lockbox customer with the payment.

In yet another aspect of the invention, transactions among bank accounts are collected and sorted according to their origins and destinations. The transactions are then split into two groups for each bank with pending transactions. The first group contains transactions involving transferring money into master accounts and the second group contains transactions involving transferring money out of master accounts. An imbalance among the master accounts is calculated. The first group of transactions is effected, followed by money transfers among the master accounts to balance the master accounts. The second group of transactions is effected after the master accounts are balanced.

Other aspects of the invention include program code, systems and devices corresponding to the methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 5 is a diagram of a typical payment document according to one embodiment of the present invention.

FIG. 6 is a diagram of an enhanced payment document according to one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Automated Invoice Capture

Figures 1, 2:
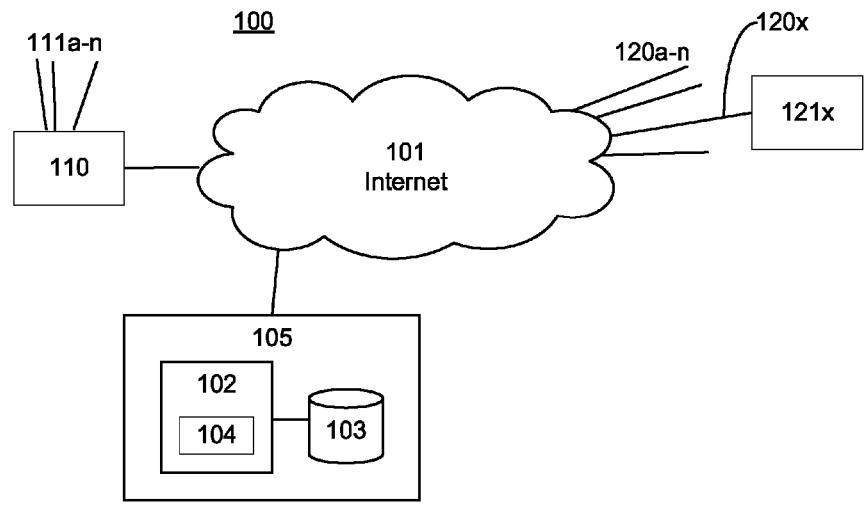
FIG. 1 is a block diagram of an exemplary system according to one embodiment of the present invention.
FIG. 2 are diagrams of two exemplary invoices according to one embodiment of the present invention.

FIG. 1 shows an overview of an exemplary system 100 according to one embodiment of the present invention. An electronic service provider 110, such as eFax Services, is connected to the Internet 101. Other intranet or networks could be used instead of the Internet. Also connected to electronic service provider 110 are multiple fax lines (or fax numbers) 111a-n for receiving faxed invoices. Customer sites 121a-n (of which, for clarity and simplicity, only 121x is shown) connect to the Internet 101 via connections 120a-n. Corporate site 105 of an operator of this exemplary system 100 is represented here by a server 102, a storage system 103, and software 104 installed on the server 102. The actual architecture of such a system may, and in most cases probably will, comprise many servers, multiple storage systems and/or hard drives, and multiple instances of software. All these possible components are represented here by the single instances of the components of site 105.

FIG. 2 shows typical invoices as received, represented here as exemplary invoices 200A and 200B, according to one embodiment of the present invention. These invoices are issued by one party (the issuer) to another party (the recipient). Invoices 200A and 200B contain the following data, although with a slightly different layout: issuer logo 201, issuer name and address 202, recipient address 203, line items 204 and total amount due 205. Other additional data such as terms, due date, etc., are not shown in FIG. 2, but such data are customarily included on typical invoices.

One aspect of the invention includes approaches for recognizing an invoice, for example identifying the issuer of the invoice and/or recognizing the layout of the invoice. Invoices can be recognized by comparing them to a database of distinguishing features. For example, invoices might be recognized based on the logo of the issuer, name and/or address of the issuer, or other data or signature features that are unique to an issuer. Once an invoice is recognized, a corresponding template can be applied to extract the relevant data from the recognized invoice.

There are various modes by which an invoice may be entered into the system and various media on which the invoice may be received. For example, the recipient of a paper invoice could fax it to a dedicated fax number for that recipient's account, such as, for example, any of fax numbers 111a-n shown in FIG. 1. Alternately, the recipient of the invoice could instruct the issuer to fax the invoice directly to said account's dedicated fax number. In yet another case, an invoice recipient may have a customized email address residing on or connected to server 102, to which invoices may be emailed with attached files of any of various popular word processing or accounting or image capture programs, such as, for example, MS Word or Adobe Acrobat. In any case such a file may be converted into an image file showing the image of the invoice. In the case of a Word file, depending on the complexity of the format, direct parsing may be applied. Alternately, the file may be printed to an Adobe Acrobat portable document file (.PDF) file and then processed as an image.

Once received, invoices can be recognized using many different types of distinguishing features beside those discussed above. Additional examples include but are not limited to black/white histograms, color histograms, sectional signatures and sectional histograms. OCR (Optical Character Recognition) can also be used as a part of the recognition process. It can be applied to just the header, to the entire invoice or to any part of the invoice. The result of the OCR can be used as the basis for recognizing an invoice. Alternately, OCR can be applied after an invoice has been recognized, in order to extract data from the invoice. Other examples of distinguishing features include metadata (e.g., fax number, issuer e-mail address, subject line, pdf- or Word-metadata, keywords, barcode), number of pages, OFX (Open Financial Exchange) download, and XML (eXtensible Markup Language) fields or tags. Other suitable structured files with a certificate may be used in other cases.

Figure 3:
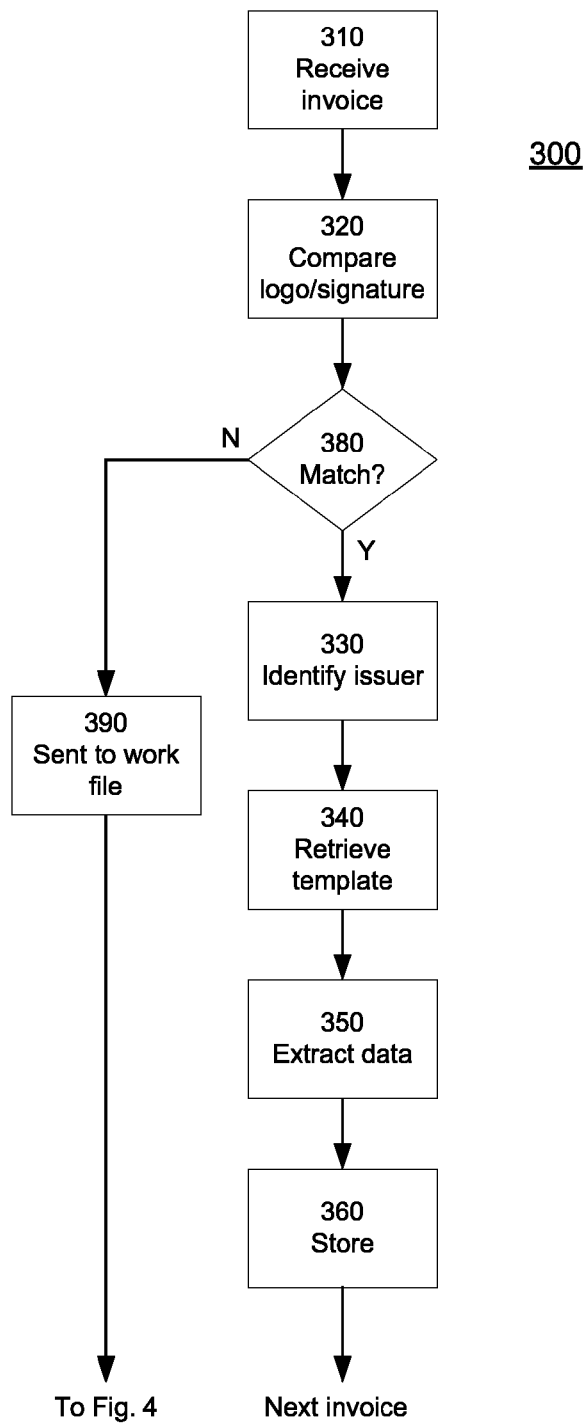
FIG. 3 is a flow diagram of an exemplary method for processing invoices according to one embodiment of the present invention.

FIG. 3 shows an exemplary process 300 for processing a typical invoice, such as invoice 200A or invoice 200B, according to one embodiment of the present invention. The process 300 may be implemented by an electronic payment system such as the one shown in FIG. 1. The invoice image is received 310, for example by one of the ways described above. It may be emailed or uploaded or transferred by any of several electronic means from the site of service provider 110 to the site of system operator 105. The system 105 compares 320 the invoice to a database in storage system 103 that contains distinguishing features for known invoices. For example, the system 105 may search for a matching logo in a library of known issuer logos or search for a matching signature (or seal) in a library of known issuer signatures. In some cases, other distinguishing features (e.g., the originating fax number, the originating email address) may be used in addition to or in place of the logo pattern and signature to recognize the invoice.

At step 380, the process branches. If no match is found (no branch), the invoice is sent 390 to a work file, in which unprocessed documents are stored. Treatment of the documents in this work file is explained below, in the description of FIG. 4. If a match is found for the logo pattern or signature (yes branch), the system 105 identifies 330 the issuer. A corresponding template for the recognized invoice is also retrieved 340 from storage system 103. The template includes instructions for extracting data from the invoice, for example it may define fields identifying where and/or in what format on the invoice certain data is expected to be located. In some cases, an issuer may have more than one template. For example, the issuer may have different templates for personal users and for business customers. As another example, the issuer may have different templates for single-page and multi-page invoices, or may simply change the format of its invoice over time or by geographic region. Accordingly, the system 105 may use more refined decision-making processes to select the correct template for a particular invoice.

Data is extracted 350 from the invoice based on the selected template, using OCR and/or other suitable means. In some cases the image may be processed using OCR before it is received 310, for example, by using OCR functions provided by Adobe and other tools by other companies. The information extracted in step 350 is preferably stored 360 in a database that also resides in storage system 103.

In one approach, once a template is identified for an invoice, data may be automatically extracted from the invoice (e.g., as identified by fields in the template). In another approach, invoices may be grouped together based on their similarity. Data extracted from certain locations in one invoice may be extracted from similar locations in other invoices in the group. Previously discovered data patterns may be reused on similar invoices. Data can also be manually extracted. Different pattern recognition engines, expert systems, rule-based engines and other approaches may also be used to extract data from invoices.

Processed invoices can also be used to check or refine the templates for an issuer. Differences between invoices for the same issuer or deviations from past norms can also be used to flag potential problems, as well as to request human review.

Figure 4:
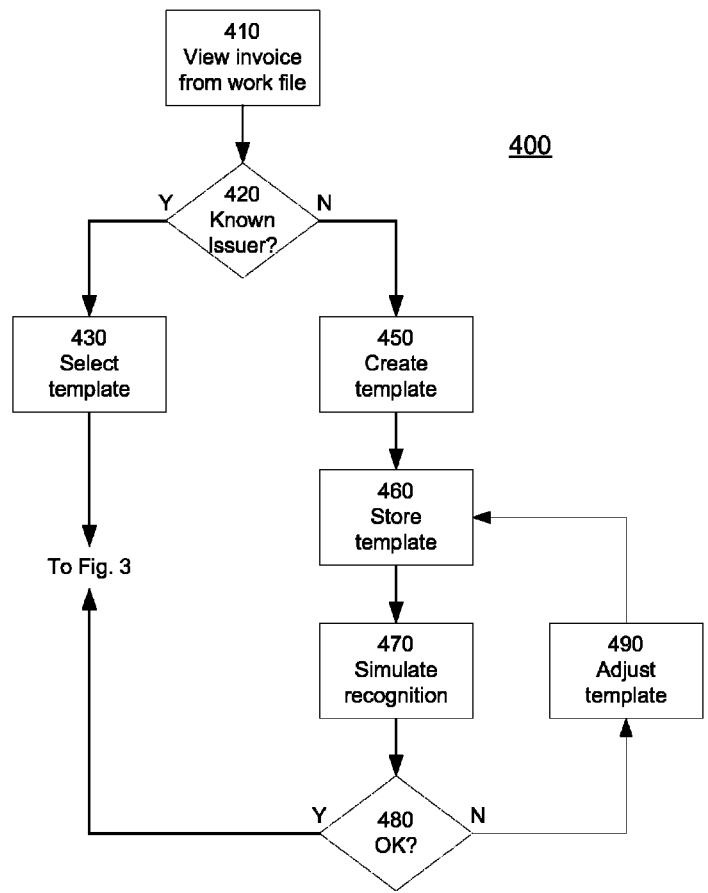
FIG. 4 is a flow diagram of an exemplary method for processing unrecognized invoices according to one embodiment of the present invention.

FIG. 4 shows an exemplary process 400 for processing unrecognized invoices that were previously stored in a work file in step 390 of FIG. 3, according to one embodiment of the present invention. An invoice is retrieved 410 from the work file, which resides in storage system 103. The invoice is presented for manual viewing 410 by a human operator. In step 420, the process branches. If the operator determines that the invoice is a document from a known issuer with known logo pattern/signature (yes branch) but, for whatever reason, the logo pattern/signature recognition has not worked (for example, a coffee stain on the logo may have made the logo unreadable to the automated recognition system), the process moves to step 430. The operator selects 430 a matching template and sends 440 the invoice back to the recognition process 300 (e.g., to data extraction step 350).

If, however, in step 420, the operator determines that the invoice cannot be matched with a known template (no branch), the operator creates 450 a new template. This new template may be created completely new or it may be created by modifying a suitable existing template. The new template, along with its issuer information and the invoice, is stored 460 in storage system 103. In step 470, a recognition simulation is performed to verify that the new template works correctly, namely that (1) the automated recognition system can properly identify the new template for the invoice and (2) data can be accurately extracted from the invoice based on the template. If, in step 480, the template simulation works correctly (yes branch), the invoice is sent 440 to the recognition process 300 as described above (e.g., to data extraction step 350). If, however, the simulation does not work correctly (no branch), the template may be manually adjusted 490. The template editor may highlight the section that created problems. For example, a field for OCR may be too narrow or too wide. If the field is too wide, for example, the system may attempt to interpret a part of the logo as a part of the address. In the case of a field that is too narrow, some characters may be cut off. The operator can adjust 490 the template accordingly to solve such problems.

Another aspect of the invention is cross-organizational learning. For example, if an invoice addressed to Customer A is identified as being from Vendor 1, and the system can then identify other signature items (image, "from" address, etc.) in the invoice. Thereafter the system may be able to use those other signature items to select the correct template for the invoice, and use that template to find the correct data in certain sections of the invoice. Additionally, if a same format invoice from this same Vendor 1 is sent to a second Customer B, then the system can recognize from the signature information that the invoice is from Vendor 1 and apply the template to the invoice to extract the correct data.

One advantage of the approach described above is that the capture of invoices can be made economical for SMEs. The number of invoices processed can be aggregated over a large number of SMEs, thus achieving economies of scale that can be shared by the businesses. In addition, although any one SME may only receive a few invoices from any particular issuer, the community of SMEs in the aggregate may receive a large number of invoices from that issuer. This then makes it cost efficient to develop templates or other processes to handle those invoices, whereas it would not be cost efficient for each SME to do so individually. The system of FIG. 1 can be implemented without significant additional investment by either the issuers or the recipients. The cost of system 105 is shared by all users and not borne entirely by one user. The recipients can send invoices to the system 105 using conventional means, such as fax and email. The invoices between issuers and recipients can be settled using conventional means such as checks, EFT, and ACH, or using advanced means such as the enhanced private interbank clearing system described in more detail below with respect to FIGS. 16A-B and 17. In addition, as described above with the example using Customers A and B, and Vendor 1, information learned from processing one recipient's invoices can be used to improve the overall process for all recipients.

In one approach, the community of recipients can themselves improve the process. For example, the system 100 can enable the community to provide input about distinguishing features of the invoices. Various recipients and/or issuers may suggest different features for recognizing invoices. There may even be a community process for determining preferred features for distinguishing invoices. A similar process can be used to determine templates, including determining fields in templates.

Another aspect of community is that different recipients can exchange their experiences of dealing with issuers. Many recipients may be in a similar situation with respect to issuers. Another beneficial aspect of the community is that SMEs are likely to deal with "small" issuers. There will be a very large number of small issuers (approximately 25 million in the U.S.), but each one issues invoices to only a small number of customers (typically, 20-30). While it is not economical for a centralized identification process to be applied to this set of issuers, it is economical to let the recipients/issuers themselves help identify the issuers and, in the aggregate, create a comprehensive catalog of the issuers.

Therefore, the described systems and processes allow the integration of paper and/or electronic document invoices into an automated system to reduce the need of manual labor (such as manual input of invoices) in processing the transactions. In addition, the systems can be fully automated and process these transactions without human intervention.

Enhanced Invoice Payment Document Generation

FIG. 5 shows an overview of a typical payment document 500 with a check section 501 and a statement section 510, according to one embodiment of the present invention. The payment document 500 is often printed on a letter- or A4-sized bifold with three sections with the check section 501 on top and the statement section 510 occupying the lower two-thirds. The check section 501 contains information about a payor 502, a payee 503, an amount in words 504, an amount in numbers 505, additional banking information 506, and information such as the ABA routing number and check number 507. The statement section 510 shows credits and invoices and also shows a total due 511 that typically reflects the amount shown in payment amounts 504 and 505. In some cases, total 511 may differ from payment amounts 504 and 505, because the total due 511 may take into account other credits or debits.

FIG. 6 shows an enhanced payment document (also referred to as an enhanced invoice payment document) 600, according to one embodiment of the present invention. As shown, the enhanced payment document 600 contains a check section 501, a communication section 610, and a payor supplemental section 611. Elements of the check section 501 are described above in FIG. 5. The lower two-thirds of the payment document 600 includes the communication section 610, which in this example is an actual copy or image of the invoice being paid by this check, and the payor supplemental section 611. The invoice image or copy in this example contains the logo 613 of the billing party, the items billed and the billing total 612, which in this example agrees with the payment amounts 504 and 505. Payor supplemental section 611 is available for optional additional payor information, such as notes about this transaction, a mini-statement, and/or an advertisement.

Figure 7:
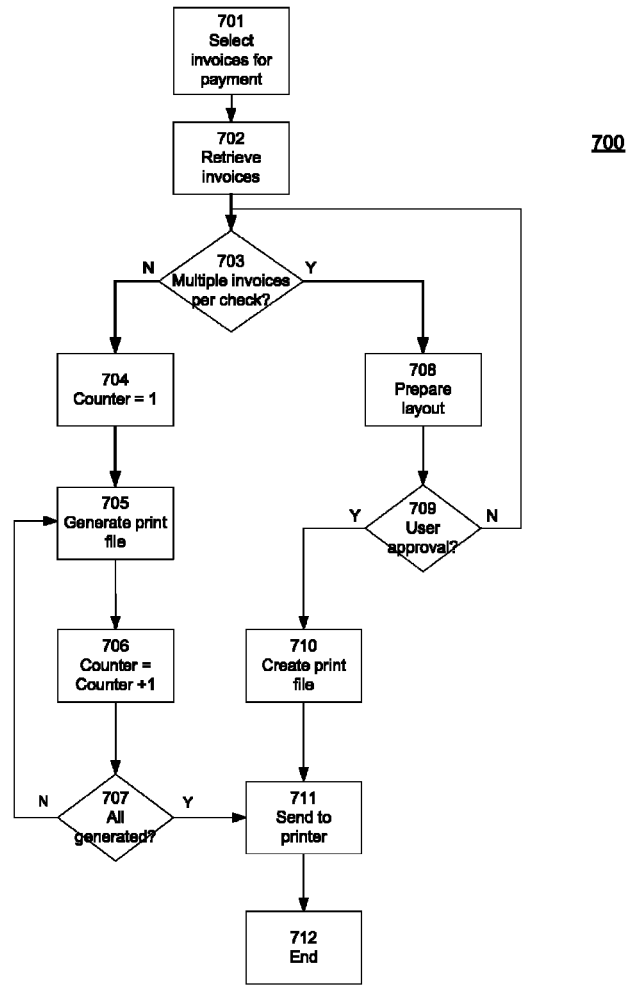
FIG. 7 is a flow diagram of an exemplary process for generating enhanced payment documents according to one embodiment of the present invention.

FIG. 7 shows an exemplary process 700 for generating the enhanced payment document 600 according to one embodiment of the present invention. The process 700 may be implemented by an electronic payment system (EPS) such as the one shown in FIG. 1. Initially, a user selects 701 invoices for payment and enters that information into the system. The system retrieves 702 the selected invoices from data repository 103.

At step 703, the system asks the user if the user wants to write one check for multiple invoices and the process branches based on the user's answer. This option may be presented to the user each time process 700 is implemented, or the user could configure the system to always select or never select this option. If a check is generated for only one invoice (no branch), the system sets 704 a counter to 1 and generates 705 a payment document print file for a first invoice. As described above for the payment document 600, the payment document contains an image of the first invoice. In step 706 the counter is advanced one increment. In step 707 the process branches, depending on whether payment documents have been generated for all the pending invoices. If all have been generated (yes branch), the process advances to step 711, where the payment document print files are printed and the payment documents are stored in data repository 103 for recording, and the process terminates at step 712. The print files may be printed locally or remotely (e.g., through the data repository 103). If payment documents have not been generated for all invoices (no branch), the process loops back from step 707 to step 705, and another payment document is generated for the next invoice, and repeats until all pending invoices are paid.

Alternatively, if, in step 703, the user elects, or the system is configured to pay multiple invoices with one check (yes branch), the system prepares 708 a layout of the payment document. The payment document may optionally be presented to the user for approval 709. If the user does not accept the layout (no branch), the process goes back to step 703, where the user may elect to print a payment document for each invoice separately. If, in step 709, the user accepts the proposed layout (yes branch), the system generates 710 a payment document print file containing multiple invoice images and whose check payment amount equals the total of all the included invoices. The invoice images may be smaller than they would be in a payment document containing only one invoice image, depending on the number of invoices being paid and the layout of the payment document. In step 711, the payment document is sent to a printer (local or remote) and data repository 103 (from which the remote printing may occur), and the process terminates at step 712.

In some cases, an image of the invoice may be printed on the same page as the check; while in other cases, multiple images may be printed. In yet other cases, one or more images may be printed on the back of the page, opening the front for classic statements or other uses, including but not limited to advertisements, promotions or campaigns.

In some cases, instead of or in addition to printing an image of the invoice on the payment document, an identifier of the invoice image may be printed on the check section of the payment document. For example, a URL (Uniform Resource Locator) of an invoice image may be printed on the face (or the back) of the check. As a result, one can correctly and easily identify the corresponding invoice for a check payment by visiting the printed URL. The identifier can also be incorporated into the payment transaction in other manners based on the nature of the payment. For example, if the payment is made through an ACH transaction, a URL of the invoice may be included in the ACH addenda field. As a result, the URL will subsequently show up on the payor and/or payee's bank's web summary and bank statement.

Therefore, the described systems and processes provide a simple, easy-to-use approach to generate enhanced invoice payment documents with features that ensure that the credits of the underlying payments are applied to the correct invoices.

Enabling Correct Check and Electronic Payment Deposit

Figure 8:
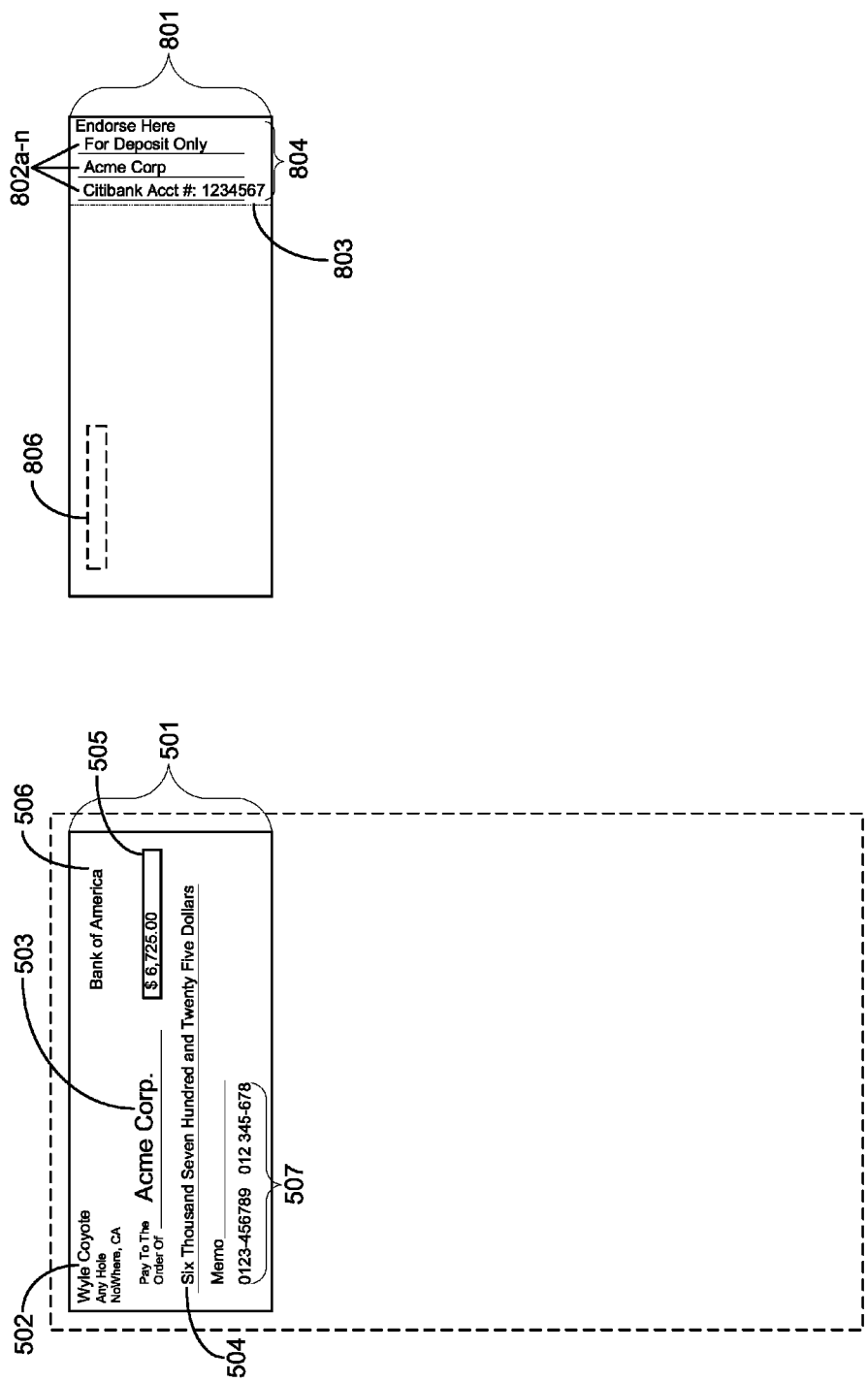
FIG. 8 shows the top part of a payment document shown in FIG. 6 according to one embodiment of the present invention.

FIG. 8 shows the top part (check section 501) of the payment document 600 shown in FIG. 6. Section 801 shows the back side of the check section 501 according to one embodiment of the present invention. Banking information 506 on the front side is shown on the back side as a dotted box 806. Also shown is the dotted line 803 that separates the endorsement section 804 from the rest of check back side 801. Also shown is a section 802*a-n* where endorsement information is preprinted on the back of the check in high-quality black ink. This endorsement information is solicited from the payee of the check before the payor mails out the check.

Having the endorsement information thus clearly printed is advantageous compared to using a standard institution endorsement stamp, because the latter can be smudged, faint, or otherwise difficult to read. Having the endorsement information clearly printed also reduces the risk of the check being erroneously or fraudulently deposited in a wrong account. Also, since the check is eventually cleared by a depositing bank, it is reasonable that the depositing bank verified the endorsement information. In addition, the deposit information may be captured from the depositing bank and transferred to the drafting bank or an electronic payment system (EPS) such as the one shown in FIG. 1 to verify payee information. As the real time processing of checks is done, all the payee information and deposit information is available to the involved banks. The payor of the check and EPS may obtain such information from the banks. In addition, as described in further detail below, the deposit information can also be used to ensure correct deposit of electronic payments.

Figure 9:
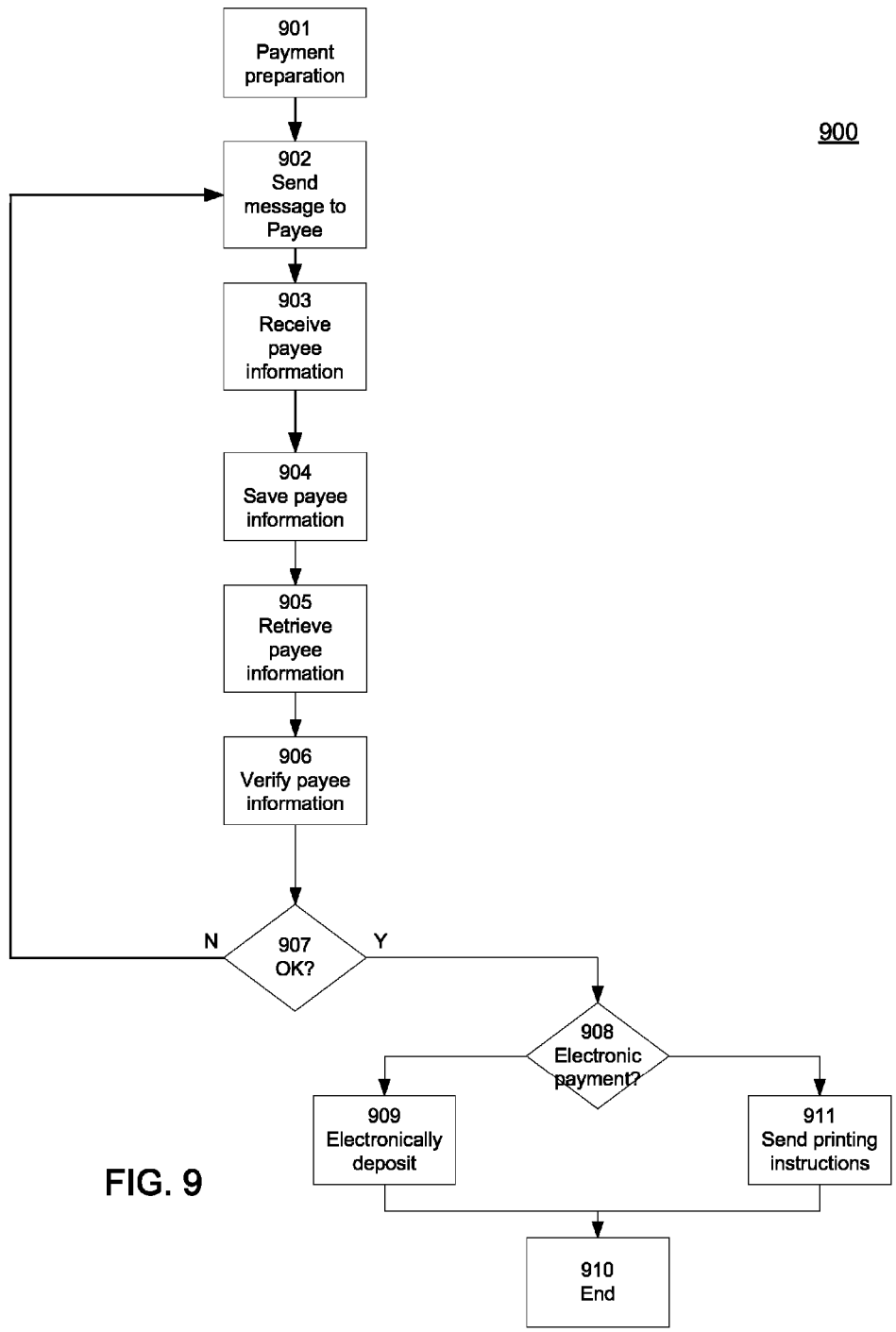
FIG. 9 is a flow diagram of an exemplary process for verifying that checks are correctly deposited according to one embodiment of the present invention.

FIG. 9 shows an exemplary process 900 for ensuring correct payment deposit according to one embodiment of the present invention. The process 900 may be implemented by an electronic payment system (EPS) such as the one shown in FIG. 1. In step 901 the system pulls payee data (e.g., payee identity, payment amount) from data repository 103 for payment preparation. In step 902 the system sends a message to a payee who has not previously participated in the service provided by the system. These messages may be sent by email, SMS (Short Message Service), facsimile, or other similar messaging systems. Such a message may, for example, contain a URL (Uniform Resource Locator) that opens a web user interface upon user selection. A user can confirm the user's payee identity and enter data such as, for example, banking information in the web user interface. In other cases, instead of a URL, a callback number may be offered, where a caller can leave payee information with a call center agent or IVR (Interactive Voice Response). In yet other cases, an email or SMS address may be included in the message, for the user to respond and provide payee information. Additional information may be provided to the payee (e.g., in the message or the web user interface) to assure the payee that, for example, the provided user information will not be passed on to the payor, or to show legitimacy of the user data solicitation (e.g., showing billing information).

The system receives 903 the solicited payee information (e.g., deposit information) from the payees and stores 904 the payee information in data repository 103. The user may respond to the soliciting message and sets up a payee account with all the required deposit information, thus helping the system to obtain new customers. In step 905 the system retrieves payee information from data repository 103. In step 906 the system may additionally verify the received payee information by executing a mock transaction. As described in detail below, the mock transaction verifies payee information through approaches such as the random deposit approach.

In step 907, the process branches. If the data is not satisfactorily verified (no branch), the process returns to step 902 and the system sends a new message to the payee soliciting information. If the data is satisfactorily verified (yes branch), the process branches again in step 908 based on whether the payment is an electronic payment. If the payment is an electronic payment (yes branch), in step 909 the system deposits the electronic payment to an account (e.g., through an ACH transaction, an EFT payment, or a wire transfer) specified by the verified payee information (e.g., account name, routing number, account number). The process ends in step 910. If the payement is a paper check payment (no branch), in step 911 the system sends print instructions to a check printer, including instructions for printing information such as the payee name, account number, ABA (American Bankers Association) number, and other similar information on the endorsement section of the check. The process ends in step 910.

If the system receives no response to its message from the payee through the web interface within an allotted time period, such as, for example, two business days, the system sends out a check to the payee without printing information on the endorsement section.

The mock transaction utilized by the system to verify 906 payee information may involve one or more transactions designated to verify various aspects of the payee information. For example, the system may create a check used to verify the deposit information provided by the payee and send the check to the payee. The check may include a partial payment of an outstanding invoice. If the check is subsequently successfully deposited, the system can assume that the depositing bank has verified the deposit information, consider such information verified, and make payment for the remaining portion of the invoice. Thus, the process allows such verification before starting electronic transfers at all, thus helping to add a layer of security to avoid payments from being misrouted.

As another example, a partial payment of an outstanding invoice may be made via electronic payment (e.g., ACH) according to the deposit information provided by the payee, and the remaining balance of the invoice may be paid via a check. Once the customer has confirmed that the electronic payment was successfully posted, the system considers the provided deposit information successfully verified and makes subsequent payments electronically according to the verified deposit information. The payee may specify a preference of electronic payment, check payment, or a combination of both. The system can make the payments according to the user preference.

As a third example, the mock transaction may conduct a random deposit that involves crediting or debiting a random small amount (typically two small transactions) and then request the payee to verify either the transaction ID or the cent amounts. The random deposit approach helps to identify inaccurate account numbers (e.g., typos) and verify that the person providing the information has legal access to the account being set up.

In another aspect, the system reconciles the payee information with additional data in addition to or instead of the random deposit approach to prevent check fraud (e.g., illegitimate account). For example, the system may populate the bank information of the payees from the endorsement from the primary bank shown on previously cleared checks, and use such information to verify against the provided payee information. If the information matches, the payee information is deemed to be verified. If there is a partial match, a judgment call is made by a risk underwriter. If there is no match, the payee fails the verification 906. Such bank information may be solicited from the depositing bank by separate transmission or from other service providers such as SafeChecks (see http://www.positivepay.net/). The information retrieved from previously cleared checks can also be used to reconcile payee identity (e.g., name) on the record to detect fraud.

In yet another aspect, the system considers certain users (e.g., administrators of working accounts) trustworthy, and either does not verify 906 or verifies 906 their payee information with less scrutiny. In addition, trusted administrators of working accounts can extend their trust or infer trust onto others by being involved with setting up accounts, for example, of key vendors or clients, thus implicitly extending their trust. A composite trust rating considers items such as how often, how much, for how long and how recently successful transactions have been completed in conjunction with a particular administrator. In some cases, a single composite score includes weighted aspects. In other cases, two or more scores may be used to represent different aspects, individually or in combination.

A trusted administrator can confer some of his or her composite trust rating by inviting and confirming new applicants. Typically, only a certain percentage of influence by the trusted administrators will be allowed to be inferred. The rest can be earned, or determined by providing multiple references. Certain events as well as non-events may reduce the trust of an administrator. Others may increase it. Typically, a separate, but related value may be used for the company of the trusted administrator, creating a network of trust relationships. This can also be used to help other things, such as the company's credit worthiness.

Therefore, the described systems and processes generate enhanced payment documents with features that ensure that the payment will be deposited in the correct account, and thus prevents mistakes and frauds. The described systems and processes also reconcile cleared checks with records and name identification data.

Correct Invoice Payment Deposit

Figure 10:
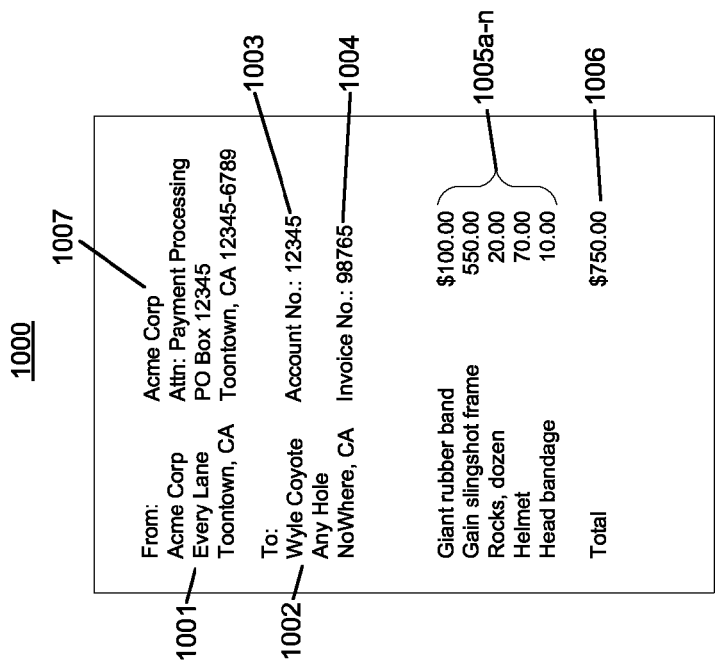
FIG. 10 is a diagram of an exemplary invoice according to one embodiment of the present invention.

FIG. 10 shows an invoice 1000 according to one embodiment of the present invention. It has, for example, the address 1001 of the issuer or sender, recipient's address 1002, items billed 1005*a-n*, payor account number 1003, invoice number 1004, bill total 1006, and an address 1007 to which to send payment. Address 1007 may contain postal address and/or electronic payment address information.

Figure 11:
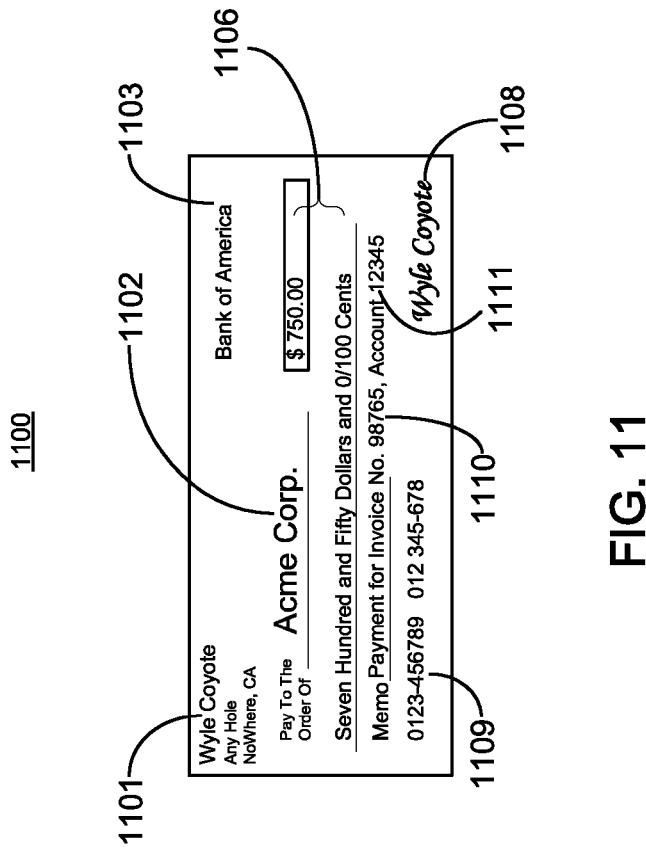
FIG. 11 is a diagram of an exemplary check according to one embodiment of the present invention.

FIG. 11 shows a typical check 1100, such as a payor might return in response to invoice 1000, according to one embodiment of the present invention. Check 1100 has, for example, a payor address 1101, a payee identity 1102, an amount field 1106 stating the check amount in both words and number, some bank information 1103, an invoice number 1110, an account number 1111, signature confirmation or other accreditation information 1108, and bank routing information 1109.

Figure 12:
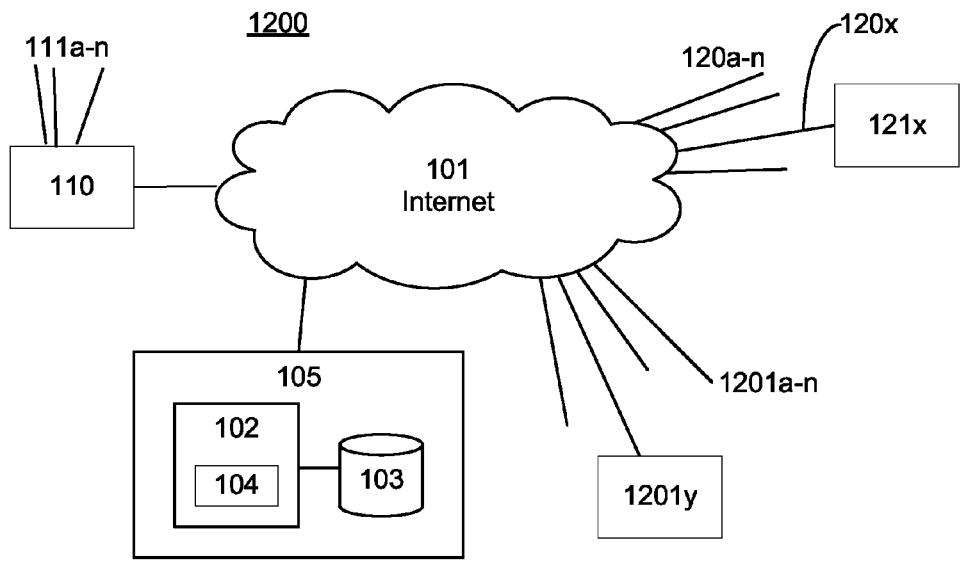
FIG. 12 is a block diagram of an exemplary system according to one embodiment of the present invention.

FIG. 12 shows an overview of an exemplary system 1200 according to one embodiment of the present invention. Similar to system 100 shown in FIG. 1, system 1200 includes an electronic service provider 110 and a corporate site 105 both connected to the Internet 101. In addition, the exemplary system 1200 provides a lockbox service at the corporate site 105, using server 102, data repository 103, and software set 104. Additional software modules may be present (not shown) at site 105. FIG. 12 also shows connections 120*a-n* for lockbox service customer sites (only 121*x* is shown) and connections 1201*a-n* for payor sites (only 1201*y* is shown). The payors are the end customers of the lockbox service customers.

Figure 13:
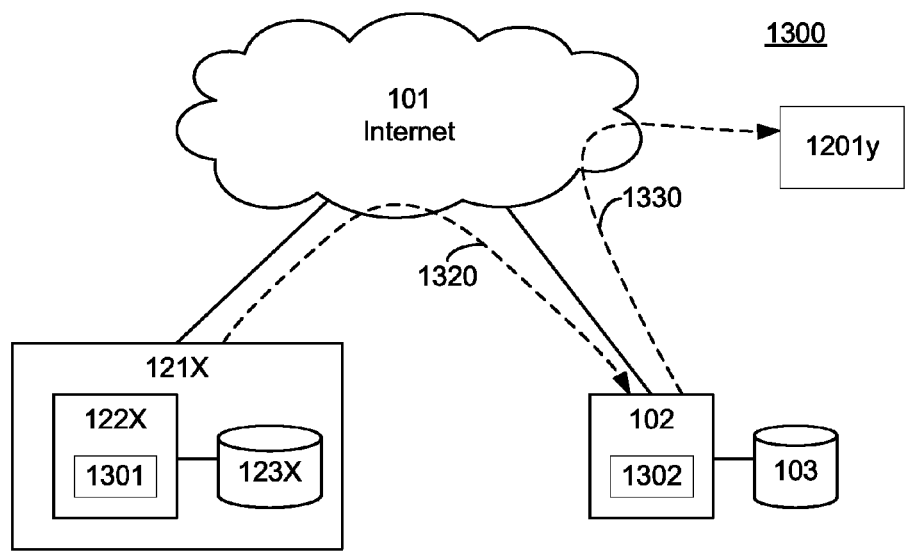
FIG. 13 is a block diagram of an exemplary billing system according to one embodiment of the present invention.

FIG. 13 shows an overview of an exemplary billing system 1300 according to one embodiment of the present invention. The lockbox customer at site 121*x* issues an invoice from system 122*x*, which has data repository 123*x* and an exemplary instance of billing software 1301. In some cases, software 1301 may be standard billing software, of any of the types that are commonly used. In other cases, software 1301 may be a web-based billing software or some other type of software. In some cases, the invoice may be issued directly from the customer's system 121*x* to the payor's system 1201*y*, transmitted by postal mailing of a printed copy or by emailing an electronic copy. In other cases, the billing information may be passed to the lockbox system 102, where it is processed and sent to the payor 1201*y* as an invoice. As shown by the dotted lines 1320, 1330, the billing information and the invoice may be transmitted electronically through the Internet 101.

In both cases, the payor number and the invoice number are made unique among the payors, the invoices, and/or payor/invoice combinations. For example, if two lockbox customers issue invoices to a same payor, the payor numbers on the two invoices may be different from each other. In some cases a unique number may be generated by lockbox operator system 102, in conjunction with data repository 103 and software 1302. Generating a unique number may be implemented as appending a unique prefix to a standard payor number and invoice number issued by customer software 1301. In some cases, the system 1300 provides a plug-in for software 1301 that can communicate with lockbox operator system 102 to download for each transaction the required information to generate unique numbers.

Figure 14:
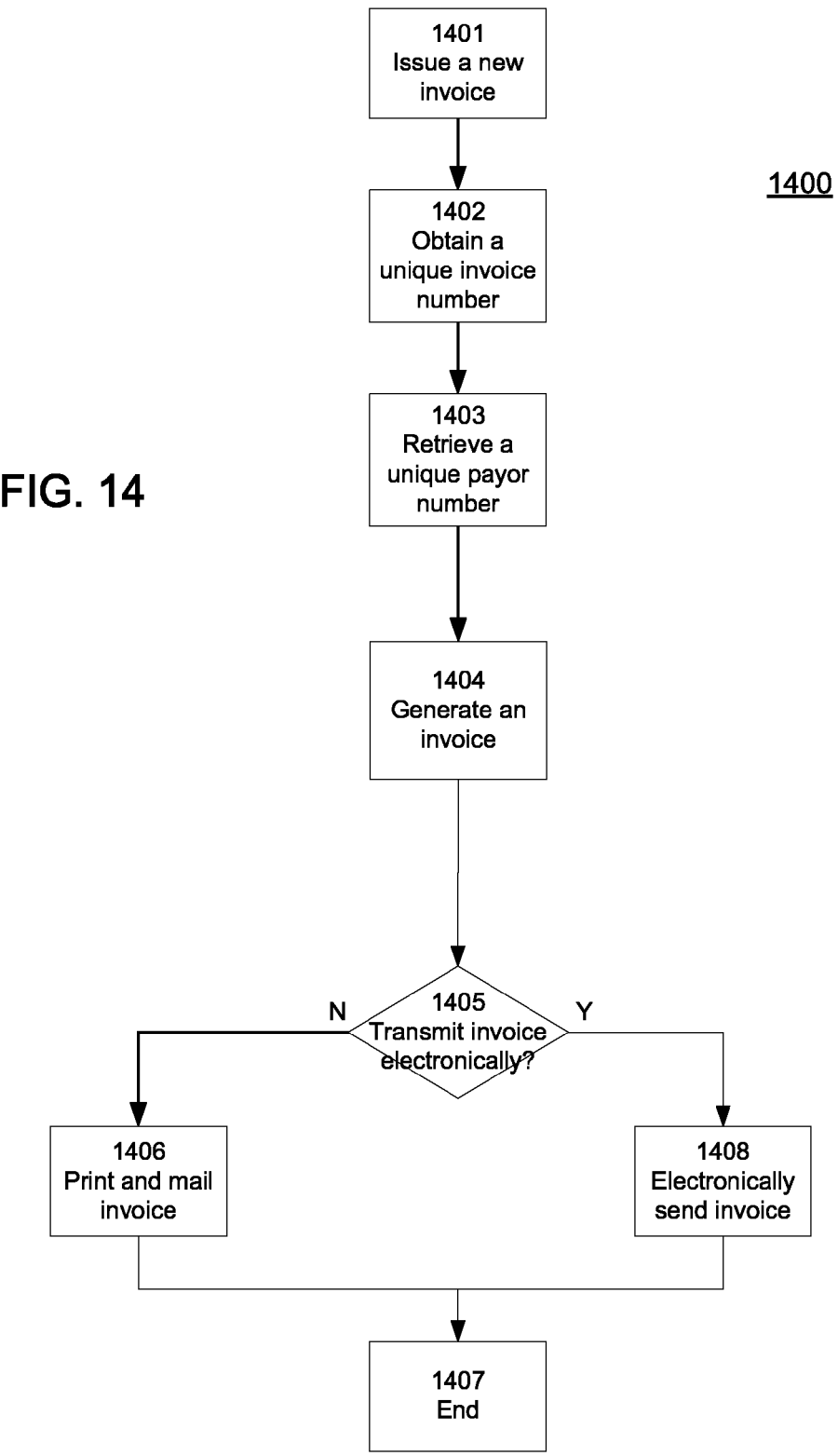
FIG. 14 is a flow diagram of an exemplary process for preparing a billing transaction according to one embodiment of the present invention.

FIG. 14 shows an exemplary process 1400 for preparing a billing transaction according to one embodiment of the present invention. In step 1401*a* lockbox customer issues a new invoice to the system 1300. In step 1402 the system 1300 obtains a unique invoice number for the invoice, either from the local system 122*x* or from the main system 102 and data repository 103. In step 1403 the system retrieves a unique payor number. If necessary, the system generates a new unique payor number for a new payor or for existing payors that do not yet have a unique payor number (e.g., for a new lockbox customer). Alternatively or additionally, the system could create a unique identifier for each payee, payor, or payee/payor combination. This unique identifier can be a combination of a generic post office box plus a code or mail stop that is unique to the payee, payor, or payee/payor combination. In step 1404 the system 1300 generates an invoice, e.g., using process 700 as shown in FIG. 7. In step 1405 the process branches. If the invoice is not transmitted to the payor electronically (no branch), in step 1406 the system prints the invoice for postal mailing and the process terminates at step 1407. If the invoice is transmitted to the payor electronically (yes branch), in step 1408 the system transmits the invoice to the payor in a suitable electronic document file (EDF) format (e.g., PDF) and then the process ends at step 1407.

Figure 15:
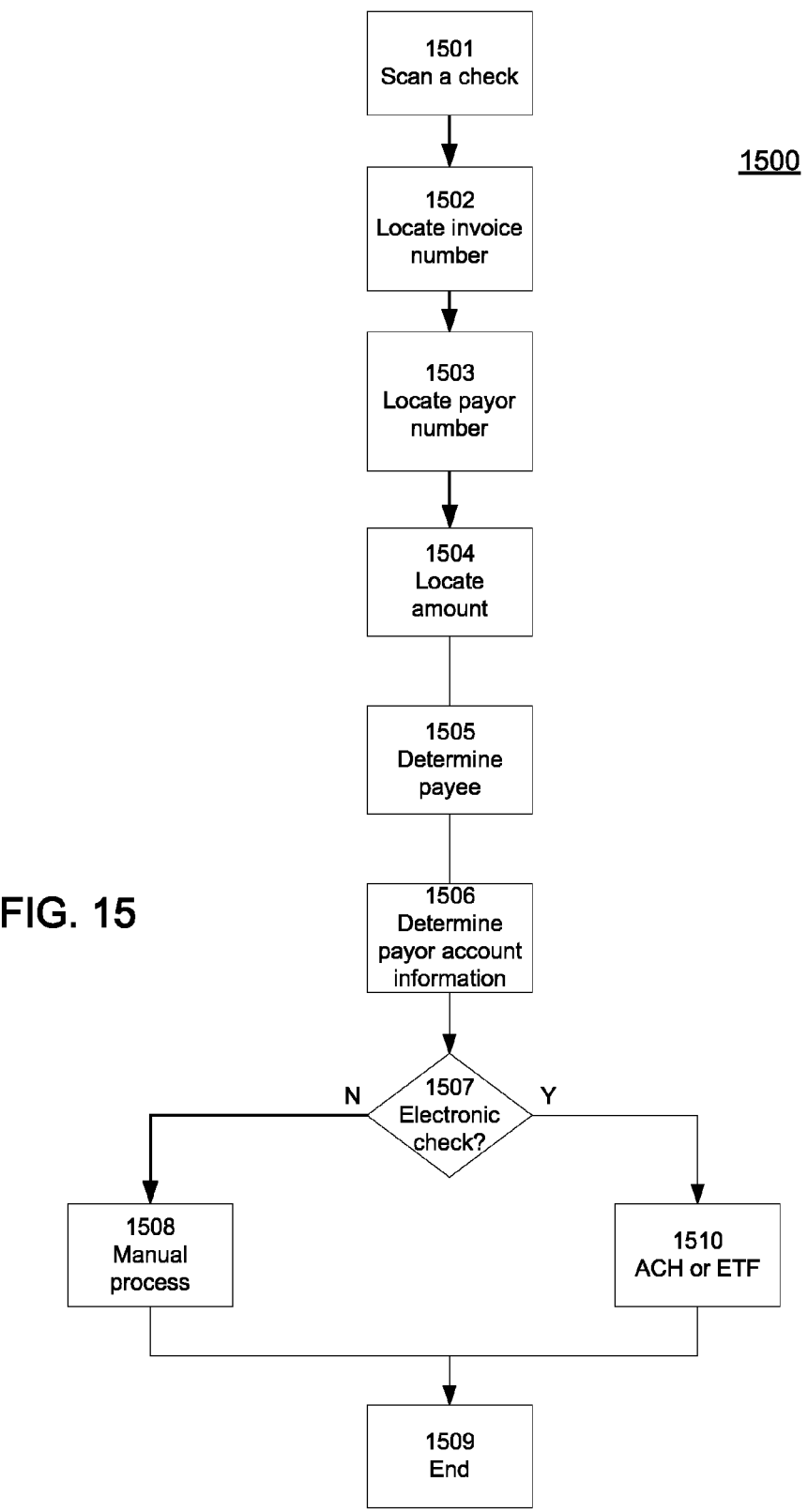
FIG. 15 is a flow diagram of an exemplary process for processing checks received from payors according to one embodiment of the present invention.

FIG. 15 shows an exemplary process 1500 for processing checks received from payors according to one embodiment of the present invention. In step 1501 a received check is scanned. In step 1502 the system locates the unique invoice number on the scanned check. In some cases, this process can be aided by having a unique signature (for example, a prefix "555" or similar) that allows the system to identify the unique invoice number more readily. In some cases the system utilizes a process similar to the one described above in FIGS. 3 and 4 to locate data in the scanned check. In step 1503 the system likewise locates the unique payor number on the scanned check. In most cases, the system needs only one of these two numbers to identify the correct lockbox customer account to deposit the check and/or to credit the correct payor account for the payment. For example, even if two lockbox customers are both depositing payments from the same payor, the system has assigned two different unique payor numbers to the payor for the two invoice payments. Therefore, the system 1300 can correctly deposit the two checks to the two lockbox customers' accounts respectively and credit the payor's two accounts for the two payments accordingly. In step 1504 the system finds the paid amount on the scanned check. Based on the information obtained from the scanned check, in step 1505 the system accesses data in data repository 103 to determine which lockbox customer is the payee. In step 1506 the system finds the lockbox customer's account information and access codes. In step 1507 the process branches based on whether the check is an electronic check. If the check is not an electronic check (no branch), in step 1508 the paper check is sent to a lockbox staff to manually processes the check, and the process terminates at step 1509. If the check is an electronic check (yes branch), the process moves to step 1510, where the system executes an ACH or EFT transaction to deposit the electronic check, and the process terminates at step 1509.

If neither the invoice number nor the payor number is available when the payment is being processed, the system could use one or more of the following approaches to resolving the payment. For example, the system could provide an exception handling user interface (UI). In this UI, a user (e.g., the payor, the payee, a lockbox staff) could look up all outstanding invoices across all companies using the lockbox service. This lookup would allow searching on any of the fields on the check, including the payor, the amount, or the payee. Another option would be for the system to credit the payment to the payee, but provide an interface for the payor/payee to select the invoice it should be applied to. Alternatively, the system could email the payor/payee to ask which invoice the payment was meant for. And, as another option, an agent could call the payor/payee to determine which invoice the payment was meant for.

Therefore, the described systems and processes efficiently and correctly deposit incoming checks to the correct lockbox clients' accounts, independent of the payor identity and of the accounting software used for issuing invoices.

Enhanced Private Interbank Clearing System

Figure 16A:
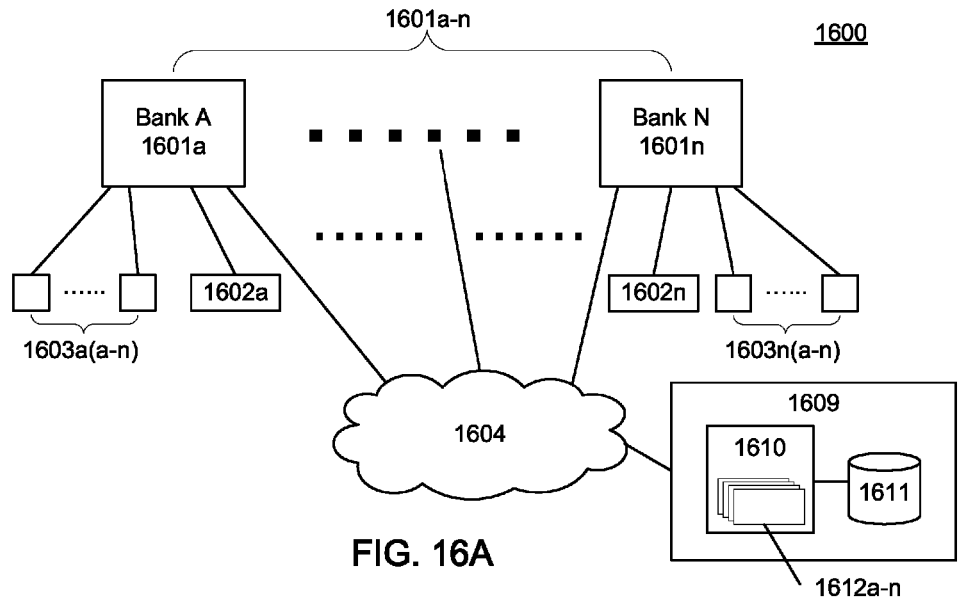
FIGS. 16A and 16B are block diagrams of a system view and an account view of an exemplary system according to one embodiment of the present invention.

FIG. 16A shows an overview of an exemplary system 1600 according to one embodiment of the present invention. System 1600 includes multiple banks 1601*a-n* and an interbank clearing system 1609, which has a server 1610, a data repository 1611, and multiple software instances 1612*a-n*. In some cases the clearing system 1609 is implemented in an electronic payment system (EPS) such as the one shown in FIG. 1. Banks 1601*a-n* and the clearing system 1609 connect through a network 1604. Network 1604 typically could be the Internet with added security or Virtual Private Networks (VPNs). In other cases network 1604 may be a private network, a wireless network, or a hard-wired network, or any combination thereof. Also shown are exemplary customer and partner accounts 1603*a(a-n)* of related parties and a clearing entity master account 1602*a* at the bank 1601*a* and reciprocal clearing entity master account 1602*n* and additional customer and partner accounts 1603*n(a-n)* at bank 1601*n*.

System 1600 thus permits the making and receiving of payments on the intra-bank host (within a specific bank 1601). Examples of intra-bank transactions include transactions between accounts 1603*a(a-n)* and 1602*a* in bank 1601*a* and, respectively, transactions between accounts 1602*n* and 1603*n(a-n)* within bank 1601*n*. The combination of these two intra-bank host-based transfers enables a transfer from a customer 1603*a(a-n)* at Bank 1601*a* to a vendor 1603*n(a-n)* at bank 1601*n* to be completed within bank clearing system 1609. Therefore, if a total of all the balances of the master account 1602*x* and customer and partner accounts 1603*x(a-n)* in a single bank 1601*x* is calculated, then to clear the transactions all that needs to be done is to effect a transfer between clearing entity master accounts 1602*a*-1602*n* at each of the respective banks 1601*a*-1601*n*, in this example, to keep the clearing entity master accounts 1602*a-n* balanced (within preset boundaries). The transfer needs not be the exactly accurate amount of the difference of the transfers effected at each end, because there may be a base balance, which, in this example, is a base amount in each of the master accounts 1602*a-n*, that is allowed to vary within a certain range.

This approach can be extended not just to two banks, but to dozens, hundreds, or all of the banks in a country or in the world. With a few strategically selected banks, in many cases a vast majority of the transactions can be effected in this way immediately. The balancing transaction between account 1602*a* and another account 1602*x* (x within b-n) to keep all the floats in the master accounts 1602*a-n* in range could be done, for example, just before the end of the day using a wire transfer, to effect immediate transfers between banks. Other similar money transfer mechanisms (e.g., ACH, EFT) may also be used.

Figure 16B:
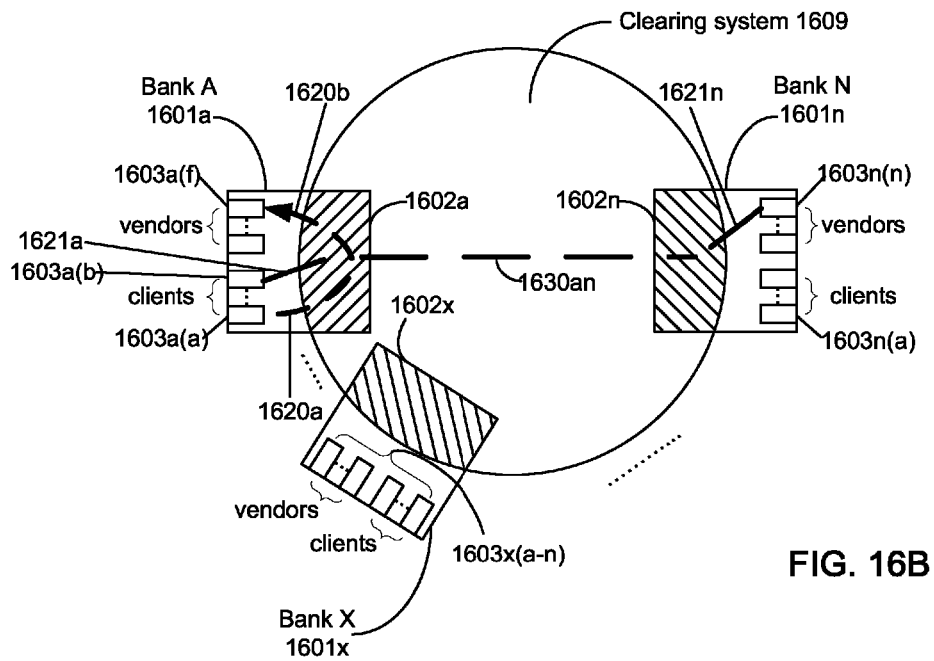

FIG. 16B shows a different view of the same systems, as a view focused on accounts and not a system view. As shown, the clearing system 1609 is represented by a circle and the participating banks are represented by blocks overlapping with the circle. The overlapped portion represents the corresponding clearing entity master accounts 1602*a-n*. The other bank accounts 1603*a-n(a-n)* are represented by blocks within the corresponding banks outside the circle.

Making and receiving intra-bank payments directly on a bank's host system enable the transfers to clear immediately (or return a message immediately if funds are not available). Therefore, such intra-bank transactions eliminate the risk to the third-party system for managing payments. In addition, when access to the bank's host is not available, the bank may provide accelerated messages for returns, allowing the ACH transactions to clear in one day rather than the customary two-day period.

In FIG. 16B, for example, a transfer from customer 1603*a* (*a*) to vendor 1603*a(n)* is executed on the intra-bank host of Bank A, from account 1603*a(a)* to clearing entity master account 1602*a* as transfer 1620*a* and then on to vendor account 1603*a(n)* as transfer 1620*b*. However, a transfer from customer 1603*a(b)* (at Bank A) to vendor 1603*n(n)* (at Bank N) is made as transfer 1621*a* from account 1603*a(b)* to master account 1602*a* (at Bank A) and then as transfer 1621*n* from master account 1602*n* to account 1603*n(n)* (at Bank N). Also shown symbolically is a transfer 1630*an*, symbolizing the clearing transactions between different master accounts 1602*a*, 1602*n* as needed to rebalance the system.

Figure 17:
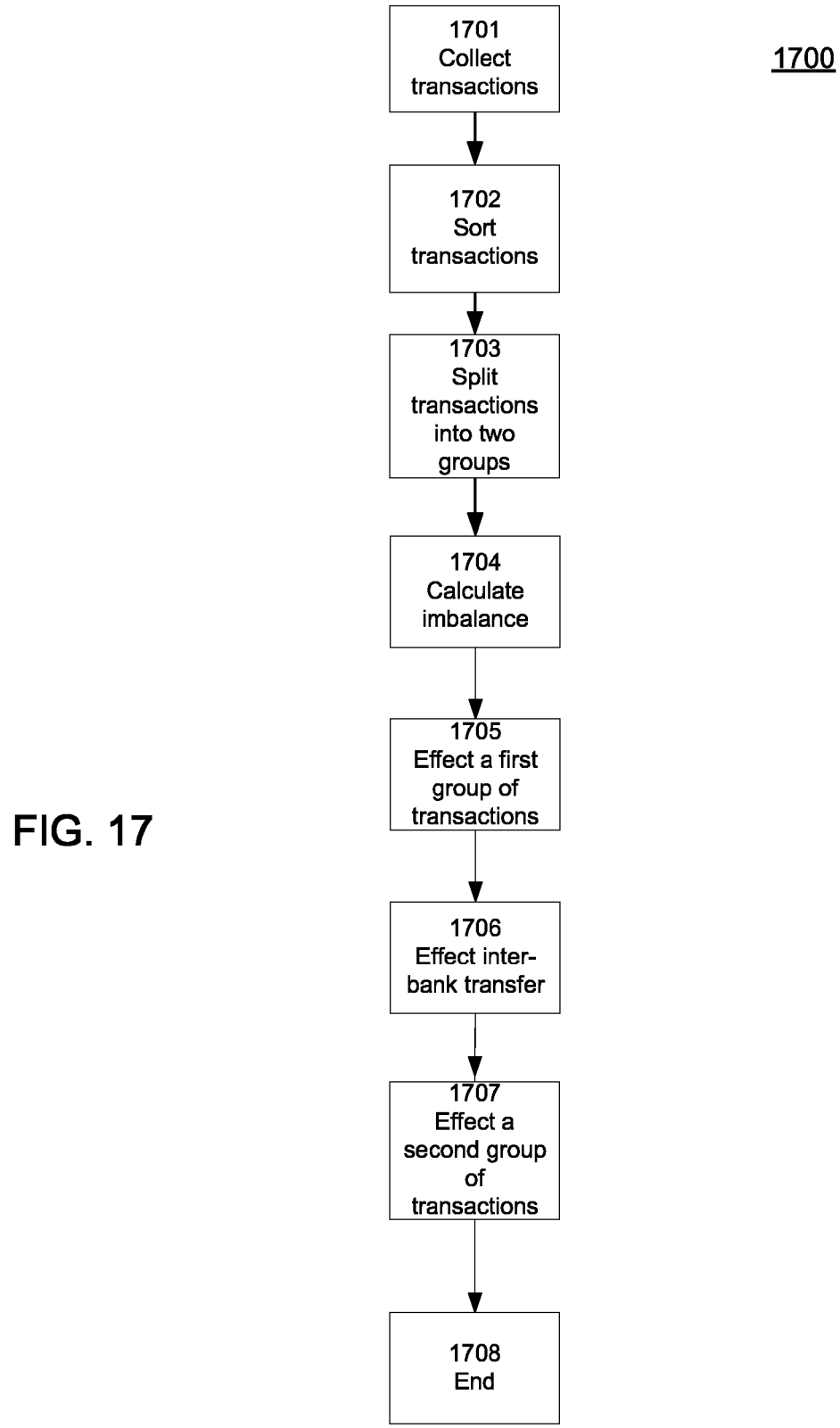
FIG. 17 is a flow diagram of an exemplary process for implementing the system shown in FIGS. 16A-B according to one embodiment of the present invention.

FIG. 17 shows an overview of an exemplary process 1700 for implementing the system shown in FIGS. 16A-B according to one embodiment of the present invention. In step 1701 all the transactions to be effected are collected from data repository 1611. In step 1702 the transactions are sorted according to their origin and destination ends. Thus, for example, a transaction from one customer account to another partner account (between accounts 103*a(a-n)*) within the same bank do not have to be taken into account in calculating the clearance between master accounts 1602*a-n*.

In step 1703 the system splits the sorted transactions into, in this example, intra-bank transaction groups A and B, for each of the banks 1601*a-n* having pending transactions. Group A contains transactions of money from the respective customer accounts 1603*x(x)* into the master account 1602*x*; and group B from the master account 1602*y* into the receiving partner account 1603*y(y)*. By splitting the transactions into two groups, the transactions transferring money to the master accounts can be effected first. In some cases, for all transactions where the initial transfer from customer accounts 1603*x* (*x*) to master account 1602*x* was successful, and where the master account balance 1602*y* supports it, the funds can be transferred immediately to customer accounts 1603*y(y)*.

In step 1704 the imbalance among the master accounts at all the participating banks can be calculated. In step 1705 the transactions in group A are effected, and in step 1706 the interbank wire is effected. In step 1707, after verifying that the interbank wire has been received, a transaction for group B (those accounts where the master account balance 1602*y* did noy support the second transfer in step 1703) is effected. Depending on the timing of the interbank wire, transaction group B may be executed on the next business day. Intra-bank (host) transactions such as those of groups A and B may be done after close of business. However, the interbank wire used in step 1706 is only available at a specific hour. The process ends at step 1708.

It is clear that many modifications and variations of this embodiment may be made by one skilled in the art without departing from the spirit of the novel art of this disclosure. For example, instead of having two transaction groups, more groups or just a single group can be defined, with the latter option of one group especially suitable in cases where the balance is sufficient. Additionally, the system could analyze the money flow among banks, based on a daily, weekly, and quarterly pattern, and other suitable factors, including but not limited to holidays, weather, economic indicators, stock market indicators, and hence calculate which amounts must be exchanged and which amounts can be taken out of balances, knowing that there is a high likelihood of the balances being replenished in the next few days. Thus this technique can reduce the amount of wire transactions. Also, in another case, a super-master account may be established as a single hub to clear multiple master accounts, or, in other situations, a master account may be established with banks that have their own real-time links to other banks, therefore allowing non-wire transfers among those linked banks in real time. These modifications and variations do not depart from the broader spirit and scope of the invention, and the examples cited here are to be regarded in an illustrative rather than in a restrictive sense.

Therefore, comparing to the conventional approaches, the described systems and processes transfer money between accounts at different banks faster and more cost-effectively.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A computer-implemented method for generating enhanced invoice payment documents, the method comprising:
   receiving, by a computer system having a processor, a plurality of invoices issued by a plurality of different issuers and issued to a plurality of different recipients;
   creating, by the computer system, a digital image of each of the plurality of invoices;
   storing, by the computer system, the digital images of the plurality of invoices in a database connected to the computer processor;
   receiving, by the computer system, an authorization from one of the recipients to make a payment by check for one or more of the plurality of invoices of a common issuer, as selected by said recipient;
   retrieving, by the computer system, an image of the selected one or more of the plurality of invoices from the database;
   generating, by the computer system, an enhanced invoice payment document, the enhanced invoice payment document containing (1) a check payable to an issuer of the selected invoice or invoices, and (2) the image of each of the selected one or more invoices;
   displaying, by the computer system, a layout of the enhanced invoice payment document to said recipient for approval; and
   responsive to receiving an approval from said recipient for the layout, preparing, by the computer system, the enhanced invoice payment document to be transmitted to an issuer.

2. The computer-implemented method of claim 1, wherein:
   the receiving authorization comprises receiving authorization from said recipient to make payment by a single check for two or more invoices selected by said recipient, the selected invoices all issued by a single issuer; and
   the enhanced invoice payment document further containing images of each of the selected invoices, wherein the images of each of the selected invoices are laid out on a same page as the check in the graphical representation of the enhanced invoice payment document.

3. The computer-implemented method of claim 1, further comprising:
   responsive to receiving a disapproval from said recipient for the layout, generating a separate enhanced invoice payment document for each one of the selected invoices, wherein each of the separate enhanced invoice payment documents for each selected invoice includes (1) a separate check payable to an issuer for payment of that selected invoice, and (2) the corresponding image of that selected invoice.

4. The computer-implemented method of claim 1, wherein the enhanced invoice payment document further comprises at least one of the following: a note about an underlying transaction, a mini-statement, and an advertisement.

5. The computer-implemented method of claim 1, wherein the image of the one or more invoices is printed on a back side of the paper on which the check is printed.

6. The computer-implemented method of claim 5, wherein a classic statement is printed on a front side of the paper.

7. The computer-implemented method of claim 1, further comprising:
   comparing the received plurality of invoices to determine distinguishing features of templates of invoices from different issuers;
   selecting templates for the invoices based on the determined distinguishing features, each template being identified with an issuer; and
   extracting data from the received plurality of invoices based on the selected templates.

8. A non-transitory computer-readable storage medium on which is encoded executable computer program instructions, the executable computer program instructions comprising instructions for:
   receiving, by a computer system having a processor, a plurality of invoices issued by a plurality of different issuers and issued to a plurality of different recipients;
   creating, by the computer system, a digital image of each of the plurality of invoices;
   storing, by the computer system, the digital images of the plurality of invoices in a database connected to the computer processor;
   receiving, by the computer system, an authorization from one of the recipients to make a payment by check for one or more of the plurality of invoices of a common issuer, as selected by said recipient;
   retrieving, by the computer system, an image of the selected one or more of the plurality of invoices from the database;
   generating, by the computer system, an enhanced invoice payment document, the enhanced invoice payment document containing (1) a check payable to an issuer of the selected invoice or invoices, and (2) the image of each of the selected one or more invoices;
   displaying, by the computer system, a layout of the enhanced invoice payment document to said recipient for approval; and
   responsive to receiving an approval from said recipient for the layout, preparing, by the computer system, the enhanced invoice payment document to be transmitted to an issuer.

9. The non-transitory computer-readable storage medium of claim 8, wherein:
   the receiving authorization comprises receiving authorization from said recipient to make payment by a single check for two or more invoices selected by said recipient, the selected invoices all issued by a single issuer; and
   the enhanced invoice payment document further containing images of each of the selected invoices, wherein the images of each of the selected invoices are laid out on a same page as the check in the graphical representation of the enhanced invoice payment document.

10. The non-transitory computer-readable storage medium of claim 8, wherein the executable computer program instructions further comprise instructions for:
    responsive to receiving a disapproval from said recipient for the layout, generating a separate enhanced invoice payment document for each one of the selected invoices, wherein each of the separate enhanced invoice payment documents for each selected invoice includes (1) a separate check payable to an issuer for payment of that selected invoice, and (2) the corresponding image of that selected invoice.

11. The non-transitory computer-readable storage medium of claim 8, wherein the image of the one or more selected invoices is printed on a back side of the paper on which the check is printed.

12. The non-transitory computer-readable storage medium of claim 8, wherein the executable computer program instructions further comprise instructions for:

comparing the received plurality of invoices to determine distinguishing features of templates of invoices from different issuers;

selecting templates for the invoices based on the determined distinguishing features, each template being identified with an issuer; and extracting data from the received plurality of invoices based on the selected templates.

13. A system comprising:

a processor and a memory storing instructions configured to instruct the processor to:

receive a plurality of invoices issued by a plurality of different issuers and issued to a plurality of different recipients;

create a digital image of each of the plurality of invoices;

store the digital images of the plurality of invoices in a database connected to the processor;

receive an authorization from one of the recipients to make a payment by check for one or more of the plurality of invoices of a common issuer, as selected by said recipient;

retrieve an image of the selected one or more of the plurality of invoices from the database;

generate an enhanced invoice payment document, the enhanced invoice payment document containing (1) a check payable to an issuer of the selected invoice or invoices, and (2) the image of each of the selected one or more invoices;

display a layout of the enhanced invoice payment document to said recipient for approval; and responsive to receiving an approval from said recipient for the layout, prepare the enhanced invoice payment document to be transmitted to an issuer.

14. The system of claim 13, wherein:

the received authorization comprises receiving authorization from said recipient to make payment by a single check for two or more invoices selected by said recipient, the selected invoices all issued by a single issuer; and the enhanced invoice payment document further containing images of each of the selected invoices, wherein the images of each of the selected invoices are laid out on a same page as the check in the graphical representation of the enhanced invoice payment document.

15. The system of claim 13, wherein the instructions are configured to further instruct the processor to:

responsive to receiving a disapproval from said recipient for the layout, generate a separate enhanced invoice payment document for each one of the selected invoices, wherein each of the separate enhanced invoice payment documents for each selected invoice includes (1) a separate check payable to an issuer for payment of that selected invoice, and (2) the corresponding image of that selected invoice.

16. The system of claim 13, wherein the image of the one or more selected invoices is printed on a back side of the paper on which the check is printed.

17. The system of claim 13, wherein the instructions are configured to further instruct the processor to:

compare the received plurality of invoices to determine distinguishing features of templates of invoices from different issuers;

select templates for the invoices based on the determined distinguishing features, each template being identified with an issuer; and extract data from the received plurality of invoices based on the selected templates.

* * * * *